US012250118B2

(12) United States Patent
Nakazato et al.

(10) Patent No.: US 12,250,118 B2
(45) Date of Patent: Mar. 11, 2025

(54) MANAGEMENT SYSTEM, AND METHOD FOR UPGRADING CLUSTER

(71) Applicant: RAKUTEN MOBILE, INC., Tokyo (JP)

(72) Inventors: Jin Nakazato, Tokyo (JP); Saki Tanaka, Tokyo (JP); Haruka Horiuchi, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 18/019,960

(22) PCT Filed: Dec. 28, 2021

(86) PCT No.: PCT/JP2021/048893
§ 371 (c)(1),
(2) Date: Feb. 6, 2023

(87) PCT Pub. No.: WO2023/127135
PCT Pub. Date: Jul. 6, 2023

(65) Prior Publication Data
US 2024/0259266 A1    Aug. 1, 2024

(51) Int. Cl.
*H04L 41/082* (2022.01)
*H04L 41/08* (2022.01)
*H04L 41/0895* (2022.01)
*G06F 11/14* (2006.01)
*H04L 41/40* (2022.01)

(52) U.S. Cl.
CPC ........ *H04L 41/082* (2013.01); *H04L 41/0886* (2013.01); *H04L 41/0895* (2022.05)

(58) Field of Classification Search
None
See application file for complete search history.

(56) References Cited

U.S. PATENT DOCUMENTS

| | | | |
|---|---|---|---|
| 10,114,665 B2 * | 10/2018 | Combellas | H04L 41/12 |
| 11,403,128 B2 * | 8/2022 | Toeroe | G06F 8/70 |
| 11,481,249 B2 * | 10/2022 | Li | G06F 9/45558 |
| 2020/0364073 A1 | 11/2020 | Obara et al. | |

FOREIGN PATENT DOCUMENTS

WO    2019/106904 A1    6/2019

* cited by examiner

*Primary Examiner* — Kamal M Hossain
(74) *Attorney, Agent, or Firm* — Sughrue Mion, PLLC

(57) ABSTRACT

To enable automatic reconstruction when upgrading a cluster realized by virtualization infrastructure without performing manual reconstruction such as resetting, a management system comprising: an NFVI which, when a VNF in which an autodiscovery flag included in setting information is set to on does not exist, performs autodeployment of the nonexistent VNF; a DB which stores setting information for a target cluster within the NFVI that is an upgrade target; an OSS which performs a work process on the autodiscovery flag included in the setting information for the target cluster stored in the DB; and a VIM which restores the work-processed setting information to the upgraded target cluster.

4 Claims, 6 Drawing Sheets

MANAGEMENT SYSTEM, AND METHOD FOR UPGRADING CLUSTER

CROSS REFERENCE TO RELATED APPLICATIONS

This application is a National Stage of International Application No. PCT/JP2021/048893 filed Dec. 28, 2021.

TECHNICAL FIELD

The present disclosure relates to a management system and a method for upgrading cluster.

BACKGROUND ART

NFV (Network Function Virtualization), which provides virtualized network functions, is known.

Conventionally, when upgrading a cluster (virtualization infrastructure) on which a VNF (Virtualized Network Function) is running, moving the VNF to another cluster, performing the upgrade on the upgrade target cluster, and reconstructing (manually resetting) the VNF on the upgraded cluster after the upgrade has been completed is typical.

Patent Document 1, which is one example of the conventional art, discloses a management apparatus which addresses the problem of reducing the effects of an upgrade or the like on a VIM (Virtualized Infrastructure Manager) when using a virtual machine operating on virtualization infrastructure to provide a user service (VNF) and comprises a first virtualization infrastructure on which a VNF is running and a second virtualization infrastructure different from the first virtualization infrastructure, which is the destination for the VNF when upgrading.

CITATION LIST

Patent Literature

Patent Document 1: WO 2019/106904 A

SUMMARY OF INVENTION

Technical Problem

However, in cases in which a virtual machine that runs on virtualization infrastructure constructs a part or the whole of a virtualized RAN (Radio Access Network), movement of the VNF affects other clusters. For example, upon a part or the whole of a CU (Centralized Unit), which is a centralized node, and a DU (Distributed Unit), which is a distributed node, being realized by virtualization infrastructure that is the upgrade target, it is necessary to carry out manual reconstruction such as resetting on the upgraded cluster after the upgrade has been completed.

The present disclosure was created in view of the above and addresses the problem of providing technology that enables automatic reconstruction when upgrading a cluster that is realized by virtualization infrastructure without performing manual reconstruction such as resetting.

Solution to Problem

One embodiment of the present disclosure that solves the problem discussed above and satisfies the objective is a management system comprising an NFVI (Network Function Virtualization Infrastructure), a DB (DataBase), an OSS (Operation Support System), and a VIM.

When a VNF for which an autodiscovery flag included in setting information is set to on does not exist, the NFVI performs autodeployment of the nonexistent VNF.

The DB stores setting information for a target cluster in the NFVI which is an upgrade target.

The OSS performs a work process on the autodiscovery flag included in the setting information for the target cluster stored in the DB.

The VIM restores the work-processed setting information to the upgraded target cluster.

Alternatively, in one embodiment of the present disclosure, when the autodiscovery flag is in an on state when upgrading the target cluster in a management system with the abovementioned configuration, the OSS work process sets the autodiscovery flag to an off state in which autodeployment is not performed and after the upgrade of the target cluster is complete, sets the autodiscovery flag to the on state in which autodeployment is performed.

Alternatively, in one embodiment of the present disclosure, the autodiscovery flag in a management system with the abovementioned configuration is put in the on state by restoring setting information of the on state.

Alternatively, in one embodiment of the present disclosure, the autodiscovery flag in a management system with the abovementioned configuration is information indicating whether or not autodeployment is to be performed on the VNF.

Alternatively, one embodiment of the present disclosure is a method for upgrading a cluster that constructs a RAN and is realized by virtualization infrastructure.

The upgrade method comprises: storing setting information of a target cluster, which is an upgrade target, in a DB; performing a work process on an autodiscovery flag which is included in the setting information of the target cluster stored in the DB and indicates whether or not to perform autodeployment; and restoring the setting information to the upgraded target cluster.

Effects of Invention

According to the present disclosure, automatic reconstruction when upgrading a cluster realized by virtualization infrastructure without performing manual reconstruction such as resetting is possible.

DESCRIPTION OF EMBODIMENTS

Hereinafter, an embodiment of the invention will be explained with reference to the attached drawings.

However, the following embodiment is an example and the invention should not be construed to be limited by these descriptions.

Figure 1:
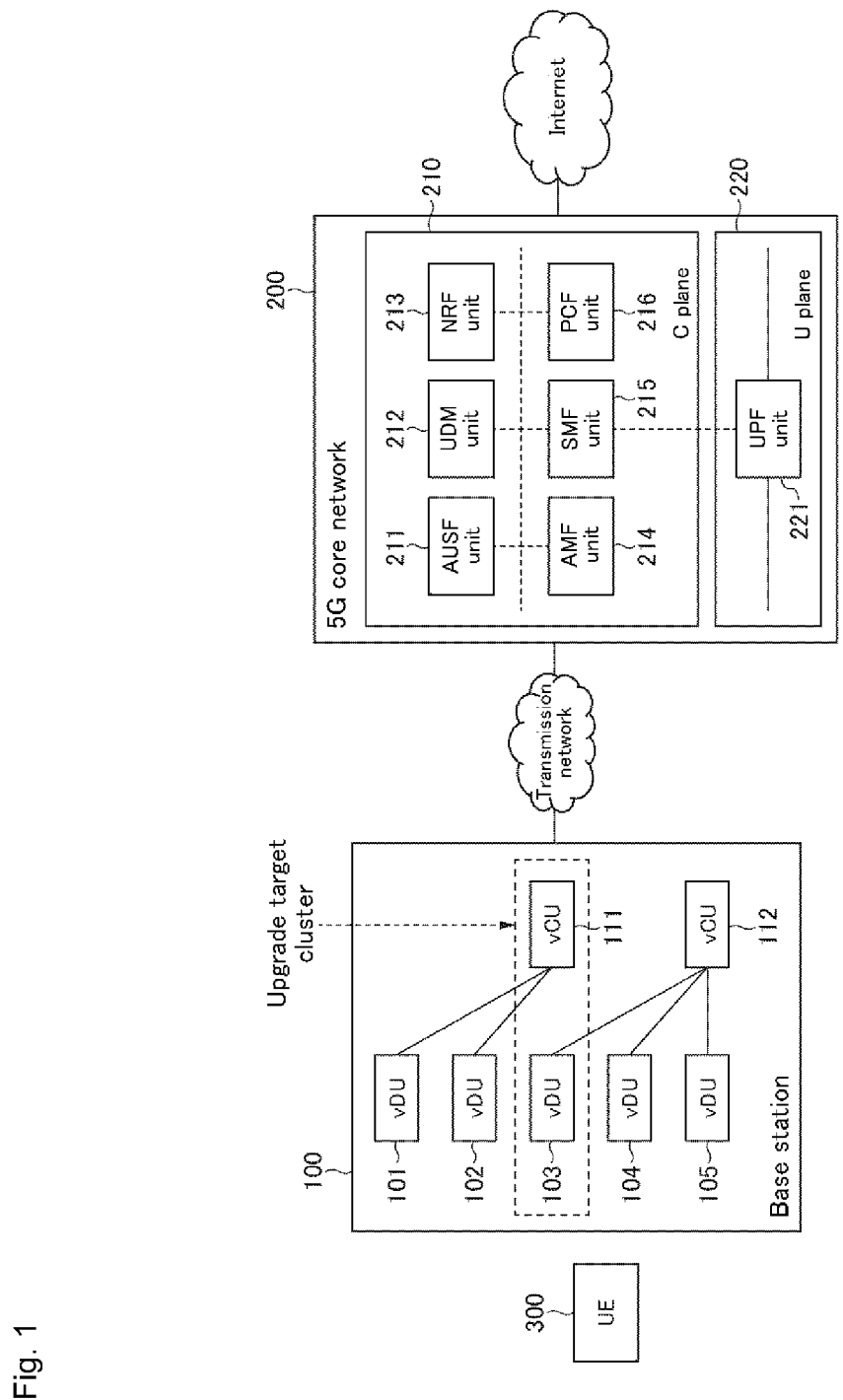
FIG. 1 is a block diagram illustrating the functional configuration of a 5G wireless communication system to which the embodiment is applied.

FIG. 1 is a block diagram illustrating the functional configuration of a 5G wireless communication system to which the present embodiment is applied.

FIG. 1 illustrates a base station 100, a 5G core network (CN: Core Network) 200, and a UE (User Equipment) 300.

In FIG. 1, the vDU 103 and vCU 111 are constructed on an NFVI (Network Function Virtualization Infrastructure) which is an upgrade target cluster.

The base station 100, known as a gNB, includes a RU (Radio Unit), a DU (Distributed Unit), and a CU (Central Unit).

The RU, the CU, and the DU constitute a radio access network (RAN: Radio Access Network).

The CU is connected to the 5G core network (CN) 200.

Here, the DU and CU are each constructed by virtualization as vDUs (virtualized Distributed Units) and vCUs (virtualized Central Units).

The vDU 101, vDU 102, vDU 103, vDU 104, and vDU 105 perform layer processes in radio communication, including at least a physical layer.

The vCU 111 and vCU 112 perform layer processes including a radio resource control (RRC: Radio Resource Control) layer at a level higher than the layers in which the vDU 101, vDU 102, vDU 103, vDU 104, and vDU 105 perform processes.

Further, the vCU 111 and vCU 112 can each connect multiple vDUs.

The vCU 111 is connected to the vDU 101 and vDU 102.

The vCU 112 is connected to the vDU 103, vDU 104, and vDU 105.

Moreover, each of the vDU 101, vDU 102, vDU 103, vDU 104, and vDU 105 are connected to one or more RUs (not shown).

That is, the base station 100 comprises the vCU 111 and vCU 112, the vDU 101, vDU 102, vDU 103, vDU 104, and vDU 105 connected to the vCU 111 or vCU 112, and one or more RUs connected to each of the vDU 101, vDU 102, vDU 103, vDU 104, and vDU 105.

Each of the one or more RUs form one or more beams, for example, by beam forming and use one of the beams to establish a connection with the UE 300.

As discussed above, the vDU 103 and the vCU 111 indicated in FIG. 1 are constructed on an NFVI which is the upgrade target cluster.

Here, the vDU 103 is communicatively connected not to the vCU 111, but to the vCU 112.

That is, the NFVI which is the upgrade target cluster comprises one or more vDUs and/or vCUs, but the vDU 103 and the vCU 111 are not a functional collection on the RAN.

However, the present disclosure is not limited thereto and the NFVI which is the upgrade target cluster may comprise one or more vDUs and/or vCUs wherein there is a functional collection therebetween.

The 5G core network 200 shown in FIG. 1 comprises a C plane 210 and a U plane 220.

The C plane 210 comprises an AUSF (Authentication Server Function) unit 211, a UDM (Unified Data Management) unit 212, an NRF (NF Repository Function) unit 213, an AMF (Access and Mobility Management Function) unit 214, an SMF (Session Management Function) unit 215, and a PCF (Policy Control Function) unit 216.

The U plane 220 comprises a UPF (User Plane Function) unit 221.

The UE 300 is a radio terminal served by the base station 100.

Figure 2:
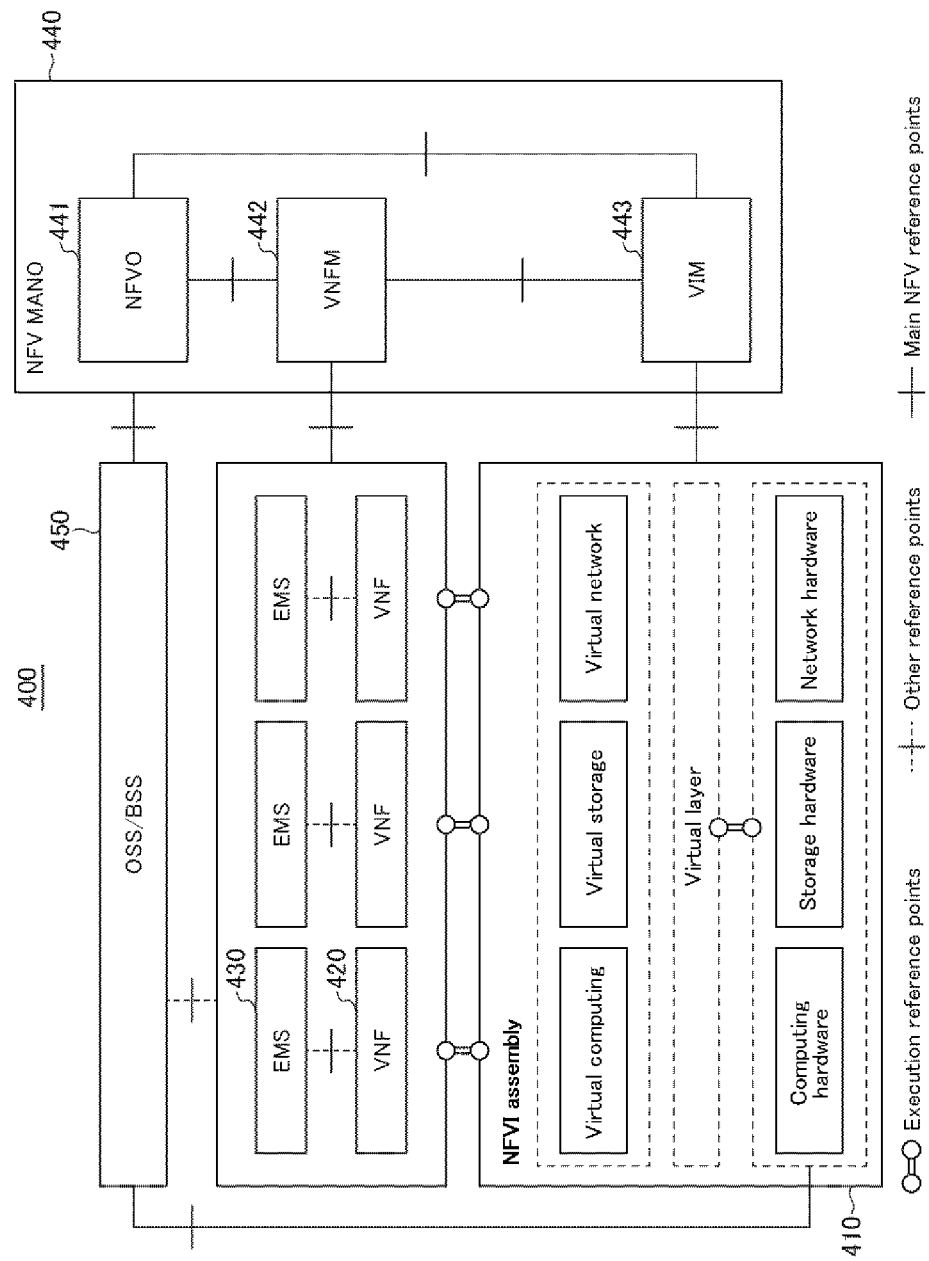
FIG. 2 is a diagram illustrating a functional block in NFV reference architecture in a virtualized network proposed under the ETSI (European Telecommunication Standards Institute) standards.

FIG. 2 is a diagram illustrating a functional block in NFV reference architecture 400 in a virtualized network proposed under the ETSI (European Telecommunication Standards Institute) standards.

The NFVI (Network Function Virtualization Infrastructure) assembly 410 comprises one or more NFVIs.

Some of the multiple NFVIs are clusters that are upgrade targets.

The multiple NFVIs are virtualization infrastructure for VNFs 420 which virtualize and realize hardware resources of a physical machine (server) on a virtualized layer such as a hypervisor.

Examples of hardware resources of a physical machine (server) can include a computing function, a storage function, and a network function.

Virtualized computing, virtualized storage, and a virtualized network can be realized by the NFVI assembly 410.

The NFVI assembly may also be referred to simply as NFVI.

The VNFs 420 are application software for network functions installed so as to operate on the NFVI assembly 410.

The VNFs 420 will sometimes be referred to as virtual nodes.

The vDU 101, vDU 102, vDU 103, vDU 104, and vDU 105, the vCU 111 and vCU 112, the AUSF unit 211, the UDM unit 212, the NRF unit 213, the AMF unit 214, the SMF unit 215, the PCF unit 216, and the UPF unit 221 in FIG. 1 correspond to the VNFs in FIG. 2.

The EMSs (Element Management Systems) 430 manage FCAPS (Fault, Configuration, Accounting, Performance, Security) regarding the VNFs 420.

The NFV MANO (Management and Orchestration) 440 comprises the NFVO (NFV Orchestrator) 441, the VNFM (VNF Manager) 442, and the VIM 443.

The NFVO 441 manages and orchestrates the NFVI assembly 410 and the VNFs 420 and realizes network service on the NFVI assembly 410.

In greater detail, the NFVO 441 allocates resources to the VNFs 420 and manages the VNFs 420.

The NVFO 441 performs autohealing (automatic fault reconfiguration), autoscaling, or life cycle management of the VNFs 420.

The VNFM 442 manages the life cycles of the VNFs 420 and provides event notification.

Here, the managed life cycles are cycles that begin with generation, go through updates, queries, healing, and scaling, and end with termination.

The VIM 443 controls the NFVI assembly 410 via a virtualized layer.

The VIM 443 performs computing, storage, and network resource management, fault monitoring of the NFVI assembly 410, which is the infrastructure on which the VNFs 420 are executed, and monitoring of resource information.

Further, in FIG. 2, of the OSS/BSS 450, OSS (Operations Support Systems) is a collective term for the systems necessary for a carrier, which is a communications provider, to construct and operate services.

Of the OSS/BSS 450, BSS (Business Support Systems) is a collective term for information systems used by a carrier, which is a communications provider, for charging and billing usage fees, responding to customers, or the like.

Figure 3:
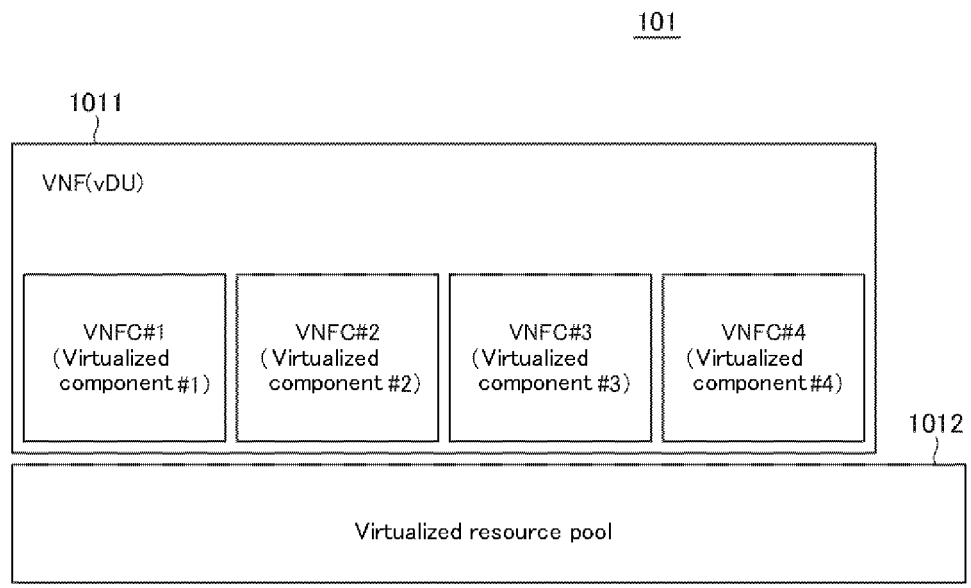
FIG. 3 is a diagram for explaining the configuration of a vDU.

FIG. 3 is a diagram for explaining the configuration of the vDU 101.

In FIG. 3, the vDU 101 is constructed in line with the NFV reference architecture 400 illustrated in FIG. 2.

Further, while the vDU 101 is exemplified here, the vDU 102, vDU 103, vDU 104, and vDU 105 also have the same configuration.

The DU functions in the base station 100 are defined as VNFs in the NFV reference architecture 400.

Hereinafter, a DU defined as a VNF will be referred to as a VNF (vDU) 1011.

The VNF (vDU) 1011 comprises four VNFCs (Virtualized Network Function Components), VNFC #1, VNFC #2, VNFC #3, and VNFC #4, but is not limited thereto and comprises one or more VNFCs.

The VNFC #1, VNFC #2, VNFC #3, and VNFC #4 by which the VNF (vDU) 1011 is constructed are virtualized components by which the vDU 101 is constructed.

In the NFV reference architecture 400, the VNFC #1, VNFC #2, VNFC #3, and VNFC #4 are also referred to as virtual machines (VMs: Virtual Machines).

The maximum number of VNFCs that the VNF (vDU) 1011 comprises is determined in accordance with the size of a virtualized resource pool 1012 that can be allocated for construction of the VNF (vDU) 1011.

In this case, the virtualized resource pool 1012 is a virtualized infrastructure for the VNF (vDU) 1011, corresponding to the NFVI assembly 410 in FIG. 2.

The VNFC #1, VNFC #2, VNFC #3, and VNFC #4, the virtualization components by which the VNF (vDU) 1011 is constructed, are installed in the virtualized resource pool 1012.

A management system 500 according to the present embodiment will be explained premised upon FIG. 1 to FIG. 3 discussed above.

Figure 4:
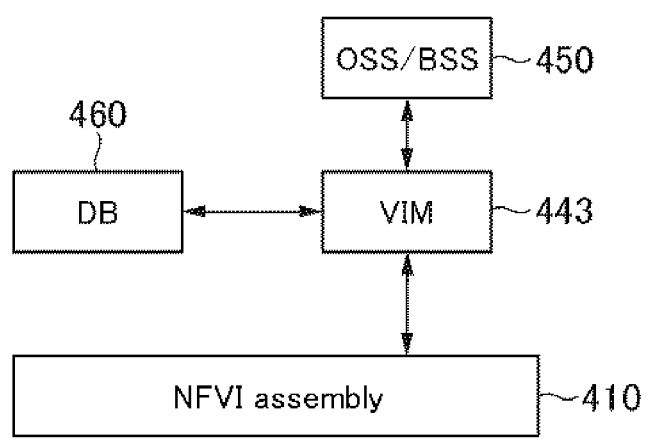
FIG. 4 is a diagram illustrating the management system according to the embodiment.

FIG. 4 is a diagram illustrating the management system 500 according to the present embodiment.

The management system 500 illustrated in FIG. 4 comprises the NFVI assembly 410, a DB 460, the OSS/BSS 450, and the VIM 443.

The DB 460 stores setting information for a target cluster which is an upgrade target.

An autodiscovery flag is included in this setting information.

The autodiscovery flag is information indicating whether or not autodeployment is to be performed.

Autodeployment is a process for reconstructing a VNF in a predetermined location.

Upon the VNF being in a down state and the autodiscovery flag being set to an on state, reconstruction of the VNF is performed by autodeployment.

The OSS/BSS 450 performs a work process as discussed below on the autodiscovery flag.

In cases in which a VNF for which the autodiscovery flag is set to on does not exist, the NFVI assembly 410 performs autodeployment of the nonexistent VNF.

The VIM 443 restores the setting information to the upgraded target cluster.

The work process of the OSS/BSS 450 is a process that, in cases in which the autodiscovery flag is in the on state when the target cluster is upgraded, sets the autodiscovery flag to an off state and sets the autodiscovery flag to the on state after the upgrade of the target cluster is complete.

Here, autodeployment is not performed if the autodiscovery flag is in the off state and autodeployment is performed if the autodiscovery flag is in the on state.

According to the management system 500 illustrated in FIG. 4, automatic reconstruction when upgrading a cluster realized by virtualization infrastructure without performing manual reconstruction such as resetting and without providing another cluster for the VNF or a reserve NFVI is possible.

As discussed above, when the VNF is in a down state, the autodiscovery flag is set to the on state in order for autodeployment to be performed.

In general, when the VNF is not in the down state, but is in an operating state, the autodiscovery flag is set to the off state.

However, in the present disclosure, the autodiscovery flag is set to the off state when upgrading a target cluster.

That is, in the present disclosure, when upgrading the target cluster, the autodiscovery flag is set to a temporary off state regardless of the VNF not being in the operating state.

Thusly, in the present disclosure, autodeployment is suppressed by setting the autodiscovery flag to the temporary off state until the upgrade is complete.

In addition, in the present disclosure, autodeployment is executed by setting the autodiscovery flag to the on state after the upgrade of the target cluster is complete.

Figure 5:
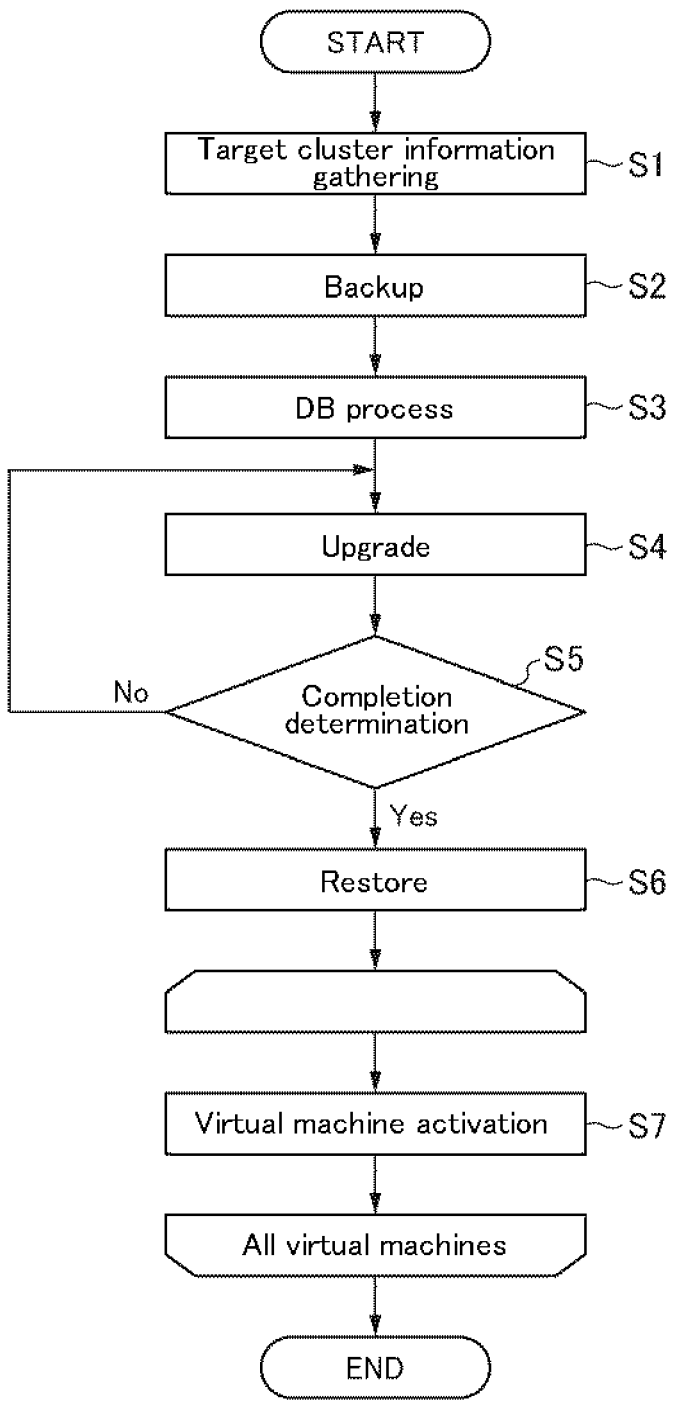
FIG. 5 is a flowchart illustrating the upgrade method for a cluster which is an upgrade target according to the embodiment.

FIG. 5 is a flowchart illustrating the upgrade method for a cluster which is an upgrade target according to the present embodiment.

The VIM 443 performs information gathering for a target cluster (S1: information gathering for target cluster).

The VIM 443 obtains setting information via the S1 process.

Upgrade version information and deployment information are included in the setting information.

The upgrade version information includes both present version information for the cluster which is the upgrade target and version information to then be upgraded to.

The deployment information includes information used in the process for reconstructing the VNF and includes information on the location at which the VNF is reconstructed and the like.

The VIM 443 stores the setting information for the target cluster, which is the upgrade target, in the DB 460 (S2: backup). The autodiscovery flag in the backed-up setting information is in the on state at this point in time.

The OSS/BSS 450 performs a work process on the setting information including the autodiscovery flag (S3: DB work process). As discussed previously, the autodiscovery flag is thereby set to the off state after this work process.

The work process may be performed until the upgrade is complete.

The OSS/BSS 450 requests the upgrade of the target cluster, which is the upgrade target, of the VIM 443.

The VIM 443 executes the upgrade of the target cluster included in the NFVI assembly 410 due to the request from the OSS/BSS 450 (S4: upgrade).

The VIM 443 determines whether or not the upgrade is complete (S5; completion determination) and, when the upgrade of all the target clusters is not complete, executes the upgrade on the target clusters in which the upgrade is not complete (S4).

The VIM 443 restores the work-processed setting information to the upgraded target cluster via the OSS/BSS 450 (S6: restore).

Thereafter, all the virtual machines are activated (S7: virtual machine activation).

Figure 6:
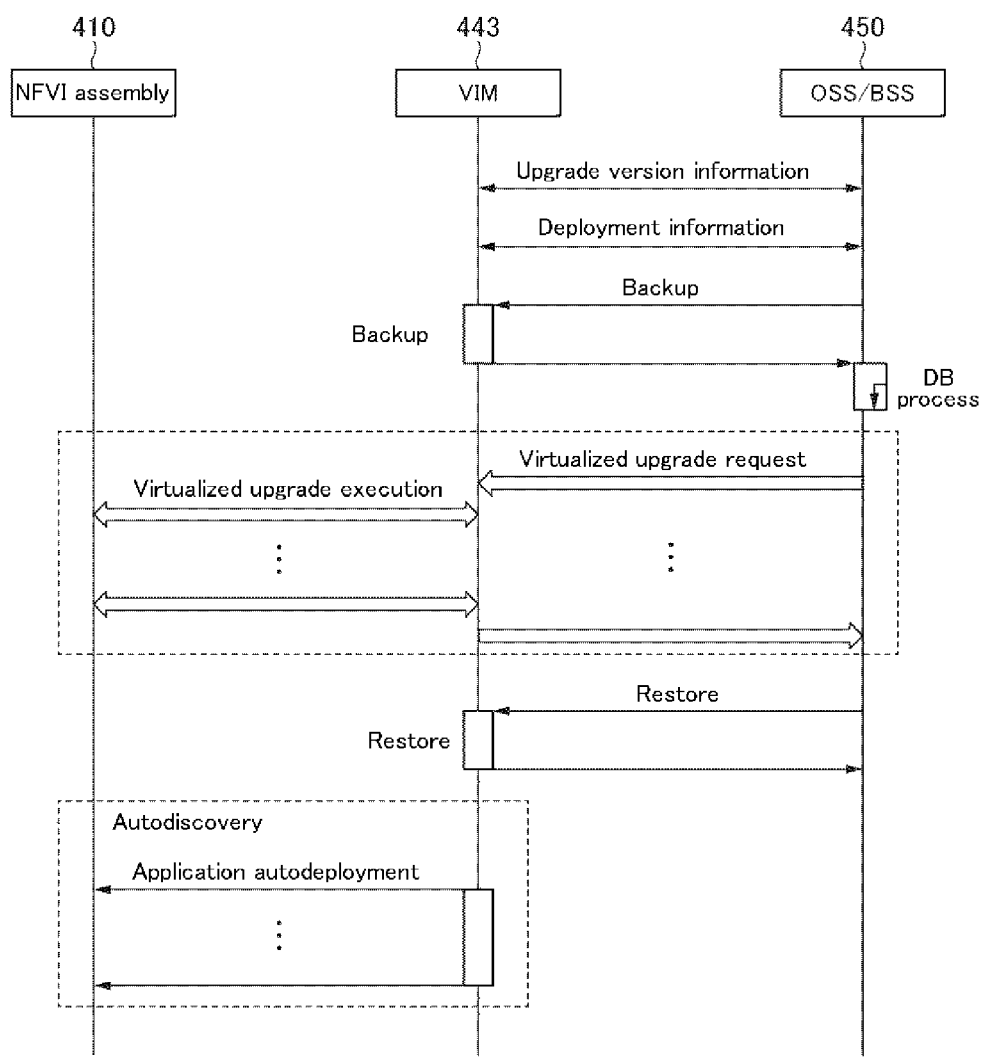
FIG. 6 is a sequence diagram of the management system according to the embodiment.

FIG. 6 is a sequence diagram of the management system 500 according to the present embodiment.

First, the VIM 443 obtains the upgrade version information and deployment information from the OSS/BSS 450.

Then the VIM 443 performs a backup to the DB 460.

The OSS/BSS 450 performs a work process on the setting information including the autodiscovery flag.

However, as discussed above, the work process may be performed until the upgrade is complete.

The OSS/BSS 450 requests the VIM 443 to execute the upgrade.

The VIM 443 executes the upgrade.

After the upgrade is complete, the VIM 443 performs a restore to the upgraded target cluster.

Here, because the setting information of the autodiscovery flag being in the on state is restored, the autodiscovery flag is in the on state and autodeployment of applications to the NFVI assembly 410 is performed.

Therefore, automatic reconstruction of applications after the upgrade becomes possible.

Figure 7:
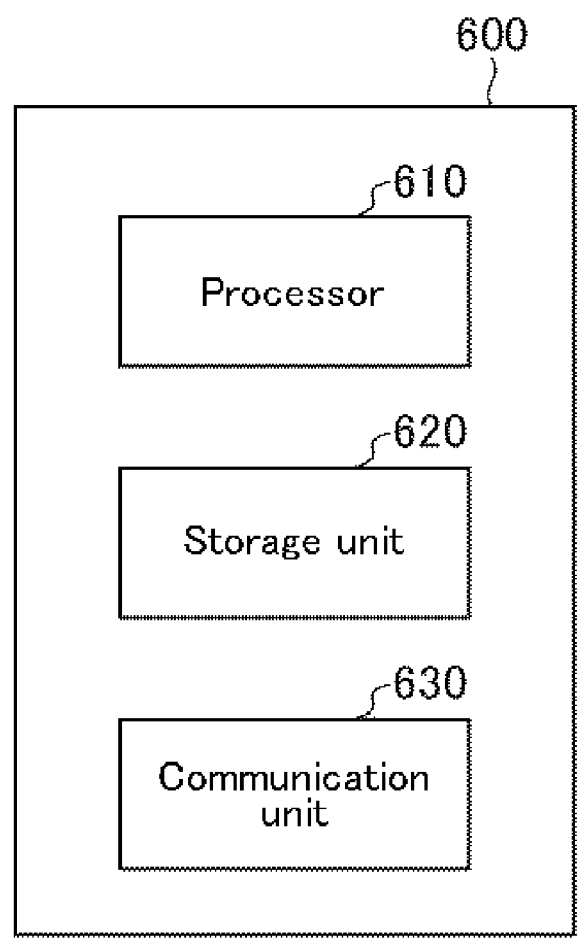
FIG. 7 is a diagram illustrating a computer system for implementing an NFVI.

FIG. 7 is a diagram illustrating a computer system 600 for implementing the NFVI assembly 410.

The computer system 600 includes one or more processors 610, one or more storage units 620, and one or more communication units 630.

The processor 610 operates in accordance with a program installed in the computer system 600.

Examples of the processor 610 can include a CPU (Central Processing Unit) and an MPU (micro processing unit).

The storage unit 620 stores a program or the like to be executed by a processor 610.

The program may be stored on a computer-readable non-transitory storage medium.

Examples of the storage unit 620 can include a ROM (Read Only Memory), a RAM (Random Access Memory), an SSD (Solid State Drive), and an HDD (Hard Disk Drive).

The communication unit 630 exchanges data outside the computer system 600, for example, with the base station 100 or the 5G core network 200.

Examples of the communication unit 630 can include communications interfaces such as an NIC (Network Interface Card) and a wireless LAN (Local Area Network) module.

SDN (Software-Defined Networking) may be installed.

(1) to (5) below are included in the above-explained present disclosure.

(1) A management system comprising: an NFVI which, when a VNF in which an autodiscovery flag included in setting information is set to on does not exist, performs autodeployment of the nonexistent VNF;
a DB which stores setting information for a target cluster within the NFVI that is an upgrade target;
an OSS which performs a work process on the autodiscovery flag included in the setting information for the target cluster stored in the DB; and a VIM which restores the work-processed setting information to the upgraded target cluster.

(2) The management system according to (1), wherein, in the work process of the OSS,
when the autodiscovery flag is in an on state when upgrading the target cluster, the autodiscovery flag is set to an off state in which autodeployment is not performed, and
after completion of the upgrade of the target cluster, the autodiscovery flag is set to the on state in which autodeployment is performed.

(3) The management system according to (2), wherein the autodiscovery flag is put in the on state by restoring setting information of the on state.

(4) The management system according to (1), wherein the autodiscovery flag is information indicating whether or not autodeployment is to be performed on the VNF.

(5) An upgrade method for a cluster that constructs a RAN and is realized by virtualization infrastructure, comprising:
storing setting information for a target cluster, which is an upgrade target, in a DB;
performing a work process on an autodiscovery flag which is included in the setting information for the target cluster stored in the DB and indicates whether or not autodeployment is to be performed, and
restoring the setting information to the upgraded target cluster.

As explained above, according to the present embodiment, automatic reconstruction when upgrading a cluster realized by virtualization infrastructure without performing manual reconstruction such as resetting is possible by setting the autodiscovery flag to the off state in the period from initiation to completion of the upgrade and setting the autodiscovery flag to the on state after the upgrade is complete.

Examples constructed in accordance with NFV reference architecture were explained for the present embodiment, but the present disclosure is not limited thereby and may be applied to configurations in which container-type virtualization technology is applied.

In configurations in which container-type virtualization technology is applied, the virtualized components correspond to the VNFs, the management unit corresponds to the VIM, and the control unit corresponds to the OSS.

Further, the present disclosure is not limited to the embodiments discussed above and includes various modified examples in which constituent elements have been added, removed, or replaced with respect to the configurations discussed above.

The term "connect" used in the present disclosure means a logical connection for communication.

For example, "an RU connected to a DU" means the DU and the RU are logically connected such that communication therebetween is possible.

Accordingly, there is no need for the DU and the RU to be directly connected physically by a physical cable or the like and multiple apparatuses or radio communications may also be disposed between the DU and the RU.

The invention claimed is:
1. A management system comprising:
a Network Function Virtualization Infrastructure (NFVI) configured to support a first Virtualized Network Function (VNF);
a database (DB) configured to store setting information, wherein the setting information is for a target cluster within the NFVI, the setting information includes an autodiscovery flag, the first VNF is deployed on the target cluster, and the target cluster is an upgrade target;
an Operation Support System (OSS) configured to perform a work process based on the autodiscovery flag, wherein the work process includes upgrading the target cluster resources supporting the first VNF; and
a Virtualized Infrastructure Manager (VIM) which restores, after a completion of the work process, the setting information with respect to the target cluster, wherein, in the work process of the OSS, when the autodiscovery flag is in an on state when upgrading the target cluster, the autodiscovery flag is set to an off state in which autodeployment is not performed, and after completion of the upgrade of the target cluster, the autodiscovery flag is set to the on state in which autodeployment is performed, whereby automatic reconstruction when upgrading the target cluster is realized by the NFVI without performing a manual reconstruction, wherein the VIM is configured to:
a) communicate concerning upgrade information with the OSS,
b) communicate concerning deployment information with the OSS,
c) receive a backup command from the OSS,
d) perform a backup to the DB,
e) receive an upgrade request from the OSS,
f) perform the upgrade with the NFVI assembly,
g) perform a restore operation with the DB, and
h) perform autodeployment, and wherein the automatic reconstruction is based on setting the autodiscovery flag to the off state in a time period from an initiation of an upgrade to a completion of the upgrade and setting the autodiscovery flag to the on state after the upgrade is complete.

2. The management system according to claim 1, wherein the autodiscovery flag is put in the on state by restoring setting information of the on state.

3. The management system according to claim 1, wherein the autodiscovery flag is information indicating whether or not autodeployment is to be performed on the VNF.

4. A method for a cluster that constructs a radio access network (RAN) and is realized by virtualization infrastructure, the method comprising:

storing, in a database (DB), setting information for a target cluster within a Network Function Virtualization Infrastructure (NFVI), wherein a first Virtualized Network Function (VNF) is supported on the target cluster, and the target cluster is an upgrade target;

performing, by an Operation Support System (OSS), a work process based on the autodiscovery flag, wherein the work process includes upgrading the target cluster; and restoring, by a Virtualized Infrastructure Manager (VIM) and after a completion of the work process, the setting information with respect to the target cluster, wherein, in the work process of the OSS, when the autodiscovery flag is in an on state when upgrading the target cluster, the autodiscovery flag is set to an off state in which autodeployment is not performed, and after completion of the upgrade of the target cluster, the autodiscovery flag is set to the on state in which autodeployment is performed, whereby automatic reconstruction when upgrading the target cluster is realized by the NFVI without performing a manual reconstruction, wherein the VIM is configured to:
a) communicate concerning upgrade information with the OSS,
b) communicate concerning deployment information with the OSS,
c) receive a backup command from the OSS,
d) perform a backup to the DB,
e) receive an upgrade request from the OSS,
f) perform the upgrade with the NFVI assembly,
g) perform a restore operation with the DB, and
h) perform autodeployment, and wherein the automatic reconstruction is based on setting the autodiscovery flag to the off state in a time period from an initiation of an upgrade to a completion of the upgrade and setting the autodiscovery flag to the on state after the upgrade is complete.

* * * * *